US011756536B2

(12) United States Patent
Sekine (10) Patent No.: US 11,756,536 B2
(45) Date of Patent: Sep. 12, 2023

(54) VOICE ANALYSIS SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

(*) Notice: Subject to any disclaimer, the term of this patent is extended or adjusted under 35 U.S.C. 154(b) by 0 days.

(21) Appl. No.: 17/624,253

(22) PCT Filed: Dec. 15, 2020

(86) PCT No.: PCT/JP2020/046827
§ 371 (c)(1),
(2) Date: Dec. 30, 2021

(87) PCT Pub. No.: WO2021/215045
PCT Pub. Date: Oct. 28, 2021

(65) Prior Publication Data
US 2022/0399011 A1     Dec. 15, 2022

(30) Foreign Application Priority Data
Apr. 24, 2020   (JP) ................... 2020-077794

(51) Int. Cl.
*G10L 15/18*   (2013.01)
*G10L 15/02*   (2006.01)
*G10L 15/32*   (2013.01)

(52) U.S. Cl.
CPC .......... *G10L 15/1815* (2013.01); *G10L 15/02* (2013.01); *G10L 15/32* (2013.01)

(58) Field of Classification Search
CPC ..... G10L 15/1815; G10L 15/02; G10L 15/32; G10L 15/10; G10L 15/22; G10L 15/26; G06F 3/01; G06F 3/16
See application file for complete search history.

(56) References Cited

U.S. PATENT DOCUMENTS 10,387,888 B2 *   8/2019   Sapoznik ............ G06F 16/245
11,302,330 B2 *   4/2022   Ge ...................... G10L 15/26
(Continued)

FOREIGN PATENT DOCUMENTS

JP   11-259269 A   9/1999
JP   2000-148185 A   5/2000
(Continued)

OTHER PUBLICATIONS

International Search Report of International Patent Application No. PCT/JP2020/046827 completed on Jan. 14, 2021 dated Jan. 26, 2021 (4 pages).
(Continued)

*Primary Examiner* — Michael Colucci
(74) *Attorney, Agent, or Firm* — Pyprus Pte Ltd; George D. Liu (57) ABSTRACT

[Object] To provide a highly accurate voice analysis system. [Solution] A voice analysis system 1 includes a first voice analysis terminal 3 and a second voice analysis terminal 5. The first voice analysis terminal 3 includes a first term analysis unit 7 that obtains first conversation information, a first conversation storage unit 9 that stores the first conversation information, a first analysis unit 11 that analyzes the first conversation information, a presentation storage unit 13, a related term storage unit 15, a display unit 17, a topic word storage unit 19, and a conversation information reception unit 25 that receives second conversation information from the second voice analysis terminal 5. The second voice analysis terminal 5 includes a second term analysis unit 21 that obtains the second conversation information and a second conversation storage unit 23. The first analysis unit 11 employs the first conversation section or the second conversation section as a correct conversation section using a relationship between a first topic word and a specific (Continued)

related term and a relationship between a second topic word and the specific related term.

7 Claims, 5 Drawing Sheets

(56) References Cited

U.S. PATENT DOCUMENTS

| | | | |
|---|---|---|---|
| 2013/0253932 A1* | 9/2013 | Ariu | G10L 15/22 704/246 |
| 2015/0149177 A1* | 5/2015 | Kains | G10L 15/1822 704/257 |
| 2017/0256262 A1* | 9/2017 | Ramachandra | G10L 15/14 |
| 2018/0268818 A1* | 9/2018 | Schoenmackers | G10L 15/26 |
| 2021/0110266 A1* | 4/2021 | Wang | G06N 20/00 |
| 2021/0225370 A1* | 7/2021 | Saito | G10L 15/28 |
| 2021/0256966 A1* | 8/2021 | Chatterjee | G06N 3/0454 |
| 2022/0092131 A1* | 3/2022 | Koukoumidis | G06F 16/3329 |

FOREIGN PATENT DOCUMENTS

| | | |
|---|---|---|
| JP | 2002-259635 A | 9/2002 |
| JP | 2010-55020 A | 3/2010 |
| JP | 2017-224052 A | 12/2017 |
| JP | WO2018/221120 A1 | 12/2018 |
| JP | 6646184 B2 | 2/2020 |

OTHER PUBLICATIONS

Written Opinion of International Patent Application No. PCT/JP2020/046827 completed on Jan. 14, 2021 dated Jan. 26, 2021 (3 pages).

\* cited by examiner

VOICE ANALYSIS SYSTEM

TECHNICAL FIELD

The present invention relates to a voice analysis system.

BACKGROUND ART

JP 2002-259635 A describes a system that displays keywords from statements made by participants in an argument during the argument in combination of drawing objects and texts.

JP 2017-224052 A describes a presentation evaluation device using a voice analysis terminal.

Although recognizing conversations by voice using one voice analysis terminal allows comparatively accurately performing voice analysis of conversations of a user close to the voice analysis terminal, there is a problem that voice analysis of conversations of a user who is far from the voice analysis terminal cannot be accurately performed.

Meanwhile, Japanese Patent No. 6646184 describes a search material information storage device.

Patent Document 1: JP 2002-259635 A
Patent Document 2: JP 2017-224052 A
Patent Document 3: Japanese Patent No. 6646184

DISCLOSURE OF THE INVENTION

Problems to be Solved by the Invention

An object of the invention of an aspect described in this Specification is to provide a voice analysis system that ensures further highly accurately performing voice recognition.

Solutions to the Problems

The invention of an aspect is basically based on knowledge that voice recognition by mutual use of conversation information analyzed by a plurality of voice analysis devices allows performing the voice recognition with further high accuracy.

The invention of an aspect described in this Specification relates to a voice analysis system 1.

This voice analysis system 1 is a system including a first voice analysis terminal 3 and a second voice analysis terminal 5. This terminal includes a computer, and respective elements described below are elements implemented by the computer. This system may further include a server.

The first voice analysis terminal 3 is a terminal that includes a first term analysis unit 7, a first conversation storage unit 9, a first analysis unit 11, a presentation storage unit 13, a related term storage unit 15, and a display unit 17, and a topic word storage unit 19.

The first term analysis unit 7 is an element configured to analyze a word included in a conversation to obtain first conversation information.

The first conversation storage unit 9 is an element configured to store the first conversation information analyzed by the first term analysis unit 7.

The first analysis unit 11 is an element configured to analyze the first conversation information stored by the first conversation storage unit 9.

The presentation storage unit 13 is an element configured to store a plurality of presentation materials.

The related term storage unit 15 is an element configured to store related terms related to the respective presentation materials stored in the presentation storage unit 13.

The display unit 17 is an element configured to display any of the presentation materials stored by the presentation storage unit 13.

The topic word storage unit 19 is an element configured to store a topic word related to a term in conversation.

The second voice analysis terminal 5 is a terminal that includes a second term analysis unit 21 and a second conversation storage unit 23.

The second term analysis unit 21 is an element configured to analyze the word included in the conversation to obtain second conversation information. The second conversation storage unit 23 is an element configured to store the second conversation information analyzed by the second term analysis unit 21.

The first voice analysis terminal 3 further includes a conversation information reception unit 25.

The conversation information reception unit 25 is an element configured to receive the second conversation information from the second voice analysis terminal 5. The first conversation storage unit is configured to also store the second conversation information received by the conversation information reception unit 25.

The first analysis unit 11 includes a specific presentation information obtaining unit 31, a first conversation section obtaining unit 33, a specific related term reading unit 35, a first term-in-conversation extraction unit 37, a first topic word extraction unit 39, a second term-in-conversation extraction unit 41, a second topic word extraction unit 43, and a conversation section employment unit 45.

The specific presentation information obtaining unit 31 is an element configured to receive information on a selection of a specific presentation material as a certain presentation material among the plurality of presentation materials.

The first conversation section obtaining unit 33 is an element configured to analyze a conversation section in the first conversation information to obtain one or a plurality of conversation sections.

The specific related term reading unit 35 is an element configured to read a specific related term as a related term related to the specific presentation material from the related term storage unit 15.

The first term-in-conversation extraction unit 37 is an element configured to extract a first term in conversation as the term in conversation that is included in a first conversation section as a certain conversation section in the first conversation information and is analyzed by the first analysis unit 11.

The first topic word extraction unit 39 is an element configured to extract a first topic word as a topic word related to the first term in conversation from the topic word storage unit 19.

The second term-in-conversation extraction unit 41 is an element configured to extract a second term in conversation as the term in conversation included in a second conversation section as the conversation section corresponding to the first conversation section in the second conversation information.

The second topic word extraction unit 43 is an element configured to extract a second topic word as the topic word related to the second term in conversation from the topic word storage unit 19.

The conversation section employment unit 45 is an element configured to employ the first conversation section or the second conversation section as a correct conversation section using a relationship between the first topic word and the specific related term and a relationship between the second topic word and the specific related term.

The conversation section employment unit 45 may be as follows.

That is, the conversation section employment unit 45 is configured such that: when the first topic word differs from the second topic word; and when the first topic word is the specific related term and the second topic word is not the specific related term, the conversation section employment unit 45 employs the first conversation section in the first conversation information as the correct conversation section; and when the first topic word is not the specific related term and the second topic word is the specific related term, the conversation section employment unit 45 employs the second conversation section in the second conversation information as the correct conversation section.

The conversation section employment unit 45 may be as follows. That is, the conversation section employment unit 45 is configured to compare a count of the first topic words being the specific related terms with a count of the second topic words being the specific related terms. The conversation section employment unit 45 is configured such that when the former is larger, the conversation section employment unit 45 employs the first conversation section as the correct conversation section. The conversation section employment unit 45 is configured such that when the latter is larger, the conversation section employment unit 45 employs the second conversation section as the correct conversation section.

In a preferred aspect of the voice analysis system 1, the first voice analysis terminal 3 further includes a recorded time storage unit 51 configured to store a recorded time and a period.

In this system, the first conversation information includes a recorded time related to each word together with the words included in the conversation. The conversation section obtaining unit 33 is configured to analyze the conversation section using clock time information for each word.

Since it is found from a pause in conversation that a speaker has changed, it is found from a period between words that the conversation section has changed.

In a preferred aspect of the voice analysis system 1, the first voice analysis terminal 3 further includes a frequency analysis unit 53 configured to analyze a frequency of a voice included in the conversation.

In this system, the first conversation information includes the frequency of the voice related to each word together with the words included in the conversation.

The conversation section obtaining unit 33 is configured to analyze the conversation section using the frequency of each word.

Since it is found from a change in tone of the voice that the speaker has changed, it is found through analysis of the frequency of a sound of each word that the conversation section has changed.

In a preferred aspect of the voice analysis system 1, the related term stored by the related term storage unit 15 includes a presenter related term and a listener related term. The conversation section obtaining unit 33 is configured to use the presenter related term and the listener related term included in the conversation information to analyze the conversation section.

Since a presentation related term used by the presenter and a term stated by a listener are different, each term is analyzed to ensure separating the conversation sections.

In a preferred aspect of the voice analysis system 1, the first voice analysis terminal 3 further includes an incorrect conversion term storage unit 55 configured to store an incorrect conversion term related to each of the plurality of presentation materials.

The first analysis unit 11 is configured such that when the incorrect conversion term related to the specific presentation material is included, the first analysis unit 11 corrects a term included in the correct conversation section using a term corresponding to the incorrect conversion term included in the correct conversation section among terms included in a conversation section not employed as the correct conversation section among the respective conversation sections. Mutual collation of the information between the first voice analysis terminal 3 and the second voice analysis terminal 5 allows obtaining a highly accurate analysis result.

Effects of the Invention

With the invention according to a certain aspect described in this Specification, voice recognition by mutual use of the conversation information analyzed by the plurality of voice analysis devices allows performing the voice recognition with further high accuracy.

DESCRIPTION OF PREFERRED EMBODIMENTS

Hereinafter, configurations to embody the present invention will be described using the drawings. The present invention is not limited to the configurations described below and includes configurations appropriately modified within a scope apparent by the person skilled in the art from the following configurations.

The invention of an aspect described in this Specification relates to a voice analysis system 1. The voice analysis system is a system to receive sound information, such as a conversation, as input information and analyze the received sound information to obtain a conversational sentence. The voice analysis system is implemented by a computer. Note that a system that replaces the sound information with character information is publicly known, and the present invention can appropriately use the configuration of the known system. This system may be implemented by a mobile terminal (a computer terminal, such as a mobile phone) or may be implemented by a computer or a server. The computer may include a processor, and the processor may achieve various functions.

Figure 1:
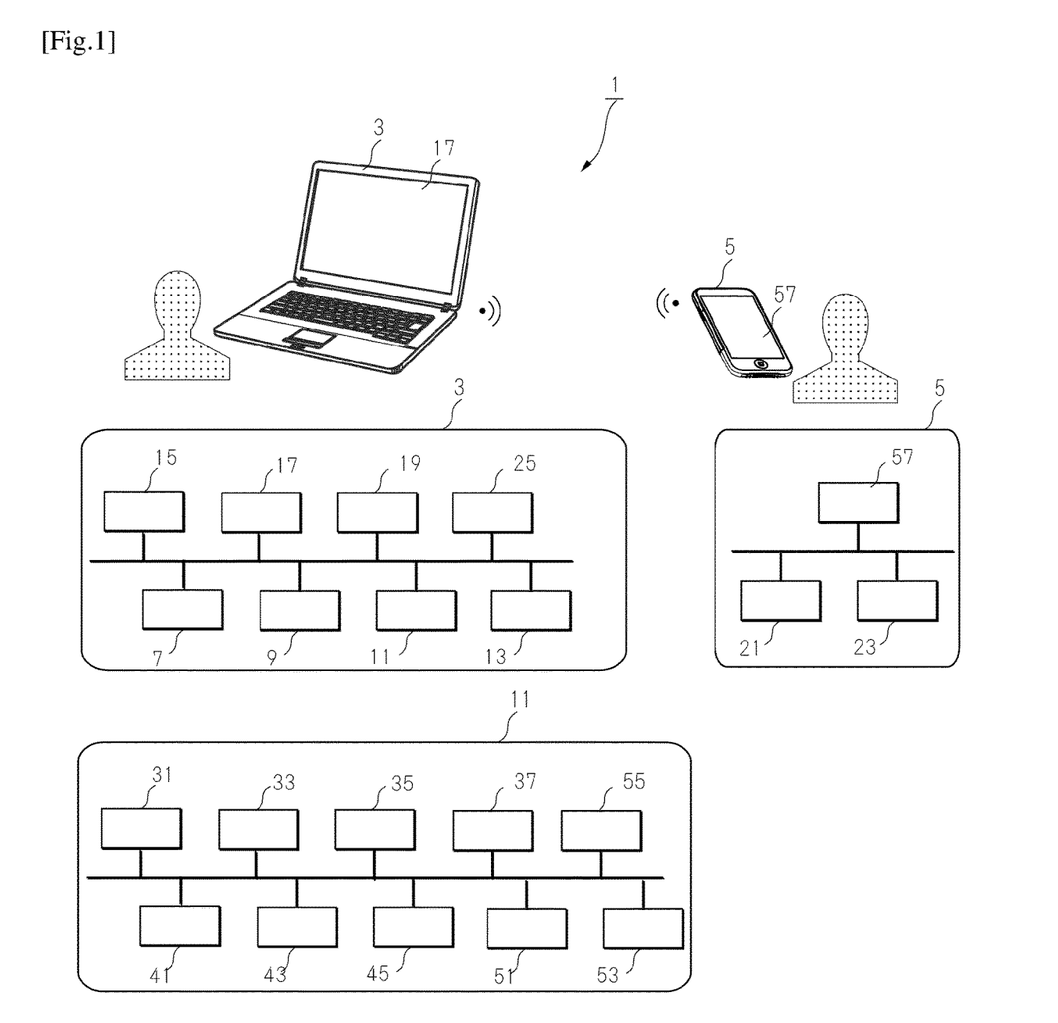
FIG. 1 is a block diagram illustrating an exemplary configuration of a voice analysis system.

FIG. 1 is a block diagram illustrating an exemplary configuration of the voice analysis system. This voice analysis system 1 is a system including a first voice analysis terminal 3 and a second voice analysis terminal 5. This terminal includes the computer, and respective elements described below are elements implemented by the computer.

The computer includes an input/output unit, a control unit, a calculation unit, and a storage unit, and the respective elements are coupled by a bus or the like so as to ensure transmitting or receiving information. For example, the control unit reads a control program stored in the storage unit and causes the calculation unit to perform various kinds of calculations using information stored in the storage unit and information input from the input/output unit. The information obtained by the calculation by the calculation unit is stored in the storage unit and also output from the input/output unit. Thus, various kinds of arithmetic processing are performed. Elements described below each may correspond to any of the elements in the computer.

The first voice analysis terminal 3 is a terminal that includes a first term analysis unit 7, a first conversation storage unit 9, a first analysis unit 11, a presentation storage unit 13, a related term storage unit 15, a display unit 17, a topic word storage unit 19, and a conversation information reception unit 25.

The first term analysis unit 7 is an element configured to analyze a word included in a conversation to obtain first conversation information. A voice is input to the first voice analysis terminal 3 via, for example, a microphone. Then, the first voice analysis terminal 3 stores the conversation (voice) in the storage unit. The first term analysis unit 7 analyzes the word included in the conversation and obtains the first conversation information. The first conversation information is conversion of the voice into sound information. An example of the sound information is like "KOREKARA TONYOBYO NI KANSURU SHINYAKU DEARU EKKU WAI ZEE NITSUITE SETSUMEI SHIMASU SOREWA KETTOUCHI WO SAGEMASUKA". For example, it is only necessary to read digitalized voice data from the storage unit in the computer, read a program from the storage unit, and analyze the read voice data by the calculation unit based on a command of the program.

The first conversation storage unit 9 is an element configured to store the first conversation information analyzed by the first term analysis unit 7. For example, the storage unit in the computer functions as the first conversation storage unit 9. The first conversation storage unit 9 stores the conversation information described above in the storage unit.

The first analysis unit 11 is an element configured to analyze the first conversation information stored by the first conversation storage unit 9. The first analysis unit 11 reads the sound information stored in the storage unit and searches for a term stored in the storage unit to convert the sound information into an appropriate term. In this respect, when a convertible term (homonym) is present, a term with a high frequency of used together with another term may be selected to increase conversion efficiency. For example, "TONYOBYO" is converted into "diabetes". Candidates for conversion of "SHINYAKU" include "new medicine", "new", "new translation", and "new role". Among them, "new medicine", which has a high frequency of appearance together with "diabetes", is selected as the term included in the conversation information. Then, the sound information stored in the storage unit is analyzed as a conversational sentence like "Now the XYZ as a new medicine for diabetes will be described. Does it lower the Duel blood?". The analyzed conversational sentence is stored in the storage unit.

The first analysis unit 11 may use the related term read related to the presentation material to increase analysis accuracy of the conversation information. For example, when a part of the conversation information "SHINYAKU" is present and "new medicine" is present as the related term, it is only necessary to analyze this "SHINYAKU" and select "new medicine". This allows enhancing analysis accuracy. In a case where a plurality of phonetic spellings are assigned to the related term and the conversation information includes it, the corresponding related term may be selected. For example, candidates for phonetic spelling of the related term "XYZ" are phonetic spellings of "XYG", "XYZ", "EXYG", and "EXYZ".

The presentation storage unit 13 is an element configured to store a plurality of presentation materials. For example, the storage unit in the computer functions as the presentation storage unit. An example of the presentation material is each page of PowerPoint (registered trademark). The presentation material is a material stored in the computer and displayed in the display unit to ensure performing the presentation to a person in conversation or an audience.

The related term storage unit 15 is an element configured to store related terms related to the respective presentation materials stored in the presentation storage unit 13. The related term may be a term related to one entire file as a presentation material, or may be a term related to a certain page included in one file. For example, the storage unit in the computer functions as the related term storage unit. An example of the plurality of related terms related to the presentation material includes terms possibly used for description based on the respective pages of PowerPoint. The storage unit stores the plurality of related terms related to the presentation material, such as PowerPoint. The storage unit stores the plurality of related terms related to the presentation material related to information (for example, a file ID and a page number) of the presentation material. Examples of the related term include "diabetes", "new medicine", "XYZ", "ABC" (name of another therapeutic agent), "blood glucose level", "side effect", "blood sugar", "glaucoma", "retinopathy", "insulin", "DC pharmaceutical", and "insert". The storage unit may store the related terms by, for example, an input to the computer by a user. Additionally, the computer automatically searches a website regarding the related term like "XYZ", and the related term related to the presentation material stored in the storage unit may be automatically updated to a term included in the searched website as necessary.

The display unit 17 is an element configured to display any of the presentation materials stored by the presentation storage unit 13. Examples of the display unit 17 include an output unit in the computer, and specifically, a monitor and a display. The computer reads the information on the presentation material stored in the storage unit and displays the presentation material in the monitor and a screen. Thus, the presentation material can be displayed for the person in conversation and the audience.

The topic word storage unit 19 is an element configured to store a topic word related to a term in conversation. The term in conversation is, for example, a term as a keyword among terms used in conversation. The topic word storage unit 19 is means to store the topic word related to the term in conversation (keyword). The topic word storage unit 19 only need to be achieved by the storage unit and an element (for example, the control program) to read information from the storage unit.

For example, it is only necessary for the topic word storage unit 19 to store the topic word, fatness, related to a keyword assumed to be used in conversations of obesity gene, obesity, and an obesity experimental animal. The topic word may be a further unified term of a plurality of keywords and a superordinate concept term. The use of the topic word allows further quick search. Examples of the topic word include a disease name, a drug name, an active ingredient name, and a pharmaceutical company name. That is, the topic word is a second conversion word related to the term in conversation. The topic words may be terms suitable to be used for search and allocated to a plurality of kinds of keywords. The topic word may be regarding a message.

The second voice analysis terminal 5 is a terminal that includes a second term analysis unit 21 and a second conversation storage unit 23. For example, the first voice analysis terminal 3 is a notebook computer or the like that is carried by an explainer, such as a Medical Representative (MR), present near the person who gives the description, and accurately records the voice of the explainer. Meanwhile, the second voice analysis terminal 5 is installed so as to be closer to the audience than the explainer, such as a position closer to a doctor than the MR, to further accurately record a voice of the person who hears the description. Examples of the second voice analysis terminal 5 include a microphone and a mobile terminal (such as a mobile phone and a smart phone). The second voice analysis terminal 5 is configured to transmit or receive the information to/from the first voice analysis terminal 3. For example, the information may be directly transmitted and received between the first voice analysis terminal 3 and the second voice analysis terminal 5, or the information can be transmitted and received via a server.

The second term analysis unit 21 is an element configured to analyze the word included in the conversation to obtain second conversation information. An example of the second conversation information includes "KOREKARA TONYUBYO NI KANSURU SHINYAKU DEARU EKKU WAI ZEE NITSUITE SETSUMEI SHIMASU SOREWA KETTOUCHI WO SAGEMASUKA". The second voice analysis terminal 5 stores the conversation input from, for example, the microphone in the storage unit. The second term analysis unit 21 reads the conversation from the storage unit and refers to the terms stored in the storage unit to obtain the conversation information. An example of the second conversation information includes "Now the XYZ 'TONYUBYO NI KANSURU SHINYAKU' will be described. Does it lower the blood glucose level?".

The second conversation storage unit 23 is an element configured to store the second conversation information analyzed by the second term analysis unit 21. The storage unit functions as the second conversation storage unit 23. That is, the second conversation information is stored in the storage unit of the second voice analysis terminal 5. The second conversation information stored in the storage unit of the second voice analysis terminal 5 is transmitted to the first voice analysis terminal 3 via, for example, an output unit, such as an antenna of the second voice analysis terminal 5.

Then, the first voice analysis terminal 3 receives the second conversation information transmitted from the second voice analysis terminal 5. The conversation information reception unit 25 in the first voice analysis terminal 3 is an element configured to receive the second conversation information from the second voice analysis terminal 5. For example, an antenna of the first voice analysis terminal 3 functions as the conversation information reception unit 25. The second conversation information is input to the first voice analysis terminal 3 via the conversation information reception unit 25 and stored in the storage unit. For example, the first conversation storage unit may also store the second conversation information received by the conversation information reception unit 25.

The first analysis unit 11 includes a specific presentation information obtaining unit 31, a first conversation section obtaining unit 33, a specific related term reading unit 35, a first term-in-conversation extraction unit 37, a first topic word extraction unit 39, a second term-in-conversation extraction unit 41, a second topic word extraction unit 43, and a conversation section employment unit 45.

The specific presentation information obtaining unit 31 is an element configured to receive information on a selection of a specific presentation material as a certain presentation material among the plurality of presentation materials. For example, the MR selects a PowerPoint (registered trademark) material regarding XYZ as the new medicine for diabetes. Then, the information that the page has been selected is input in the computer via an input device of the computer. It is only necessary to treat the input information as information on the selection of the specific presentation material.

The first conversation section obtaining unit 33 is an element configured to analyze a conversation section in the first conversation information to obtain one or a plurality of conversation sections. The first conversation section obtaining unit 33 may also analyze the conversation section in the second conversation information to obtain one or a plurality of the conversation sections. The conversation section is a conversation part usually separated by a Japanese period (°). The conversation section may be one sentence. Alternatively, the conversation section may be changed when a speaker changes. Reasonably, depending on the conversation, the conversation section is not necessarily the same as that of written word.

For example, two conversation sections, "KOREKARA TONYOBYO NI KANSURU SHINYAKU DEARU EKKU WAI ZEE NITSUITE SETSUMEI SHIMASU" and "SOREWA KETTOUCHI WO SAGEMASUKA" are obtained from "KOREKARA TONYOBYO NI KANSURU SHINYAKU DEARU EKKU WAI ZEE NITSUITE SETSUMEI SHIMASU SOREWA KETTOUCHI WO SAGEMASUKA". Alternatively, two conversation sections, "Now the XYZ as a new medicine for diabetes will be described." and "Does it lower the Duel blood?" are obtained from "Now the XYZ as a new medicine for diabetes will be described. Does it lower the Duel blood?". The method for obtaining the conversation section is publicly known.

The specific related term reading unit 35 is an element configured to read a specific related term as a related term related to the specific presentation material from the related term storage unit 15. The storage unit in the computer functions as the related term storage unit 15. Using the information on the specific presentation material, the specific related term reading unit 35 reads the related term stored related to the specific presentation material as the specific related term from the storage unit as the related term storage unit 15. The specific related term may be one or plural. The read specific related term may be appropriately stored in the storage unit. For example, the calculation unit and the storage unit in the computer function as the specific related term reading unit 35.

For example, "diabetes", "new medicine", "XYZ", "ABC" (name of another therapeutic agent), "blood glucose level", "side effect", "blood sugar", "glaucoma", "retinopathy", "insulin", "DC pharmaceutical", and "insert" are stored in the related term storage unit 15 related to a PowerPoint (registered trademark) material regarding XYZ, a new medicine for diabetes. Accordingly, the specific related term reading unit 35 reads these terms related to the PowerPoint (registered trademark) material regarding XYZ, which is the specific presentation material, as the specific related terms and stores them in the storage unit.

The first term-in-conversation extraction unit 37 is an element configured to extract a first term in conversation as the term in conversation that is included in a first conversation section as a certain conversation section in the first conversation information and is analyzed by the first analysis unit 11. The term in conversation is a term included in a conversation. The term in conversation included in first conversation section of the first conversation information and analyzed by the first analysis unit 11 is the first term in conversation. For example, the storage unit stores the term in conversation analyzed by the first analysis unit 11. It is only necessary for the first term-in-conversation extraction unit 37 to read the term in conversation included in the first conversation section from the terms in conversation stored in the storage unit and cause the storage unit to store it. Thus, the first term in conversation can be extracted. For example, the calculation unit and the storage unit in the computer function as the first term-in-conversation extraction unit 37.

For example, among "Now the XYZ as a new medicine for diabetes will be described." and "Does it lower the Duel blood?", "Now the XYZ as a new medicine for diabetes will be described." is defined as the first conversation section. "Does it lower the Duel blood?", is defined as the conversation section continuous with the first conversation section. The first conversation section includes the first terms in conversation, "diabetes", "new medicine", and "XYZ".

The first topic word extraction unit 39 is an element configured to extract the first topic word as a topic word related to the first term in conversation from the topic word storage unit 19. The topic word storage unit 19 stores the topic word related to the term in conversation. Accordingly, it is only necessary to read the first term in conversation from the storage unit and extract the first topic word as the topic word related to the first term in conversation from the topic word storage unit 19 using the read first term in conversation. For example, the calculation unit and the storage unit in the computer function as the first topic word extraction unit 39.

As described above, examples of the first term in conversation include "diabetes", "new medicine", and "XYZ". The topic word common to them is "XYZ". A plurality of topic words may be extracted from the respective terms in conversation.

The second term-in-conversation extraction unit 41 is an element configured to extract a second term in conversation as the term in conversation included in a second conversation section as the conversation section corresponding to the first conversation section in the second conversation information. For example, the first analysis unit 11 analyzes the term in conversation included in the second conversation information. Note that the second voice analysis terminal may include a second analysis unit to analyze the term in conversation included in the second conversation information. In this case, the second voice analysis terminal may transmit the analyzed term in conversation included in the second conversation information to the first voice analysis terminal. The analyzed term in conversation included in the second conversation information may be transmitted to a server.

An example of the second conversation section is "Now the XYZ 'TONYUBYO NI KANSURU SHINYAKU' will be described". Examples of the second term in conversation include "TONYU", "BYO", "NI KAN", "SHINYAKU", and "XYZ".

The second topic word extraction unit 43 is an element configured to extract a second topic word as the topic word related to the second term in conversation from the topic word storage unit 19. The second topic word extraction unit 43 is similar to the first topic word extraction unit 39.

Examples of the second term in conversation include "TONYU", "BYO", "NI KAN", "SHINYAKU", and "XYZ". Among the topic words related to them, an example of the topic word that is common to the many second terms in conversations is "the Bible".

The conversation section employment unit 45 is an element configured to employ the first conversation section or the second conversation section as a correct conversation section using a relationship between the first topic word and the specific related term and a relationship between the second topic word and the specific related term. It is only necessary for the conversation section employment unit 45 to read the first topic word, the second topic word, and the specific related term from the storage unit, analyze the relationships between them using the calculation unit, and based on the analysis result, employ the first conversation section or the second conversation section as the correct conversation section. For example, the calculation unit and the storage unit in the computer function as the conversation section employment unit 45. Thus, the correct conversation section is employed not using the relationship between the term in conversation and the specific related term, but using the relationship between the topic word related to the term in conversation and the specific related term, and therefore the correct conversation section can be employed objectively and accurately. While an incorrect conversion occurs especially in the use of the term in conversation, the use of the topic word further enhances the association with the specific related term, and therefore the correct conversation section can be employed accurately.

For example, the first topic word is "XYZ", the second topic word is "the Bible", and the specific related terms are "diabetes", "new medicine", "XYZ", "ABC" (name of another therapeutic agent), "blood glucose level", "side effect", "blood sugar", "glaucoma", "retinopathy", "insulin", "DC pharmaceutical", and "insert". In this case, since the first topic word, "XYZ", matches one of the specific related terms, the first conversation section is employed as the correct conversation section.

Note that when both of the first topic word and the second topic word are one of the specific related terms, coefficients (ranks) are assigned to the specific related terms and stored in the storage unit, and the conversation section having the topic word matching the specific related term with high rank may be employed as the correct conversation section.

The conversation section employment unit 45 may be as follows. That is, the conversation section employment unit 45 is configured such that: when the first topic word differs from the second topic word; and when the first topic word is the specific related term and the second topic word is not the specific related term, the conversation section employment unit 45 employs the first conversation section in the first conversation information as the correct conversation section; and when the first topic word is not the specific related term and the second topic word is the specific related term, the conversation section employment unit 45 employs the second conversation section in the second conversation information as the correct conversation section. For example, the first topic word, the second topic word, and the specific related term are read from the storage unit. The conversation section employment unit 45 causes the calculation unit to perform a process whether the first topic word matches the specific related term. Additionally, the calculation unit is caused to perform a process whether the second topic word matches the specific related term. In this respect, the calculation unit may be caused to perform arithmetic processing whether the first topic word is same as the second topic word. When the calculation unit determines that the first topic word is the specific related term and the second topic word is not the specific related term, the first conversation section in the first conversation information is employed as the correct conversation section and the storage unit stores the result. Meanwhile, when the first topic word is not the specific related term and the second topic word is the specific related term, the second conversation section in the second conversation information is employed as the correct conversation section and the storage unit stores it. Thus, the first conversation section or the second conversation section can be employed as the correct conversation section.

The conversation section employment unit 45 may be as follows. That is, the conversation section employment unit 45 is configured to compare a count of the first topic words being the specific related terms with a count of the second topic words being the specific related terms. The conversation section employment unit 45 is configured such that when the former is larger, the conversation section employment unit 45 employs the first conversation section as the correct conversation section. The conversation section employment unit 45 is configured such that when the latter is larger, the conversation section employment unit 45 employs the second conversation section as the correct conversation section.

For example, it is only necessary that the topic words related to the respective first terms in conversation and second terms in conversation are all read, the counts of the plurality of read topic words matching the specific related terms are measured, and the conversation section having the larger count is employed as the correct conversation section. Note that coefficients may be assigned to the respective specific related terms such that a further high score is given when the specific related term further related to the presentation material matches the topic word, and thus the conversation section with the high score may be employed as the correct conversation section.

Hereinafter, an example of the method for obtaining the conversation section (embodiments) will be described. In a preferred aspect of the voice analysis system 1, the first voice analysis terminal 3 further includes a recorded time storage unit 51 configured to store a recorded time and a period. In this system, the first conversation information includes a recorded time related to each word together with the words included in the conversation. The conversation section obtaining unit 33 is configured to analyze the conversation section using clock time information for each word. For example, when a silent state continues for a certain period of time or more after a voice continues for a certain period of time, it can be said that the conversation section has changed. It can be found from a period between words that the conversation section has changed. In this case, for example, the storage unit in the computer causes the first conversation storage unit to store the first conversation information and causes the clock time storage unit 51 to associate each piece of the information of the first conversation information with the clock time and store it. Then, for example, when the first analysis unit 11 analyzes the first conversation information, the clock times of the respective pieces of conversation information are read, thus ensuring obtaining the time interval. A threshold stored in the storage unit is read, the read threshold is compared with the obtained time interval, and when the time interval is larger than the threshold, it may be determined to be a conversation section. The second voice analysis terminal 5 also preferably includes a second clock time storage unit to store a recorded time and a period. Then, collating the periods of the conversations allows grasping a correspondence relationship between each section of the first conversation information and each section of the second conversation information.

In a preferred aspect of the voice analysis system 1, the first voice analysis terminal 3 further includes a frequency analysis unit 53 configured to analyze a frequency of a voice included in the conversation. In this system, the first conversation information includes the frequency of the voice related to each word together with the words included in the conversation. The conversation section obtaining unit 33 is configured to analyze the conversation section using the frequency of each word. Since it is found from a change in tone of the voice that the speaker has changed, it is found through analysis of the frequency of a sound of each word that the conversation section has changed. In this case as well, it is only necessary that the storage unit is caused to store frequency information of the voice associated with each piece of the information included in the conversation information, the frequency information that is caused to be stored in the storage unit is read and a change in frequency is obtained by the first analysis unit 11, and the conversation section is obtained from this. Additionally, the storage unit may store the terms indicative of the conversation sections in advance, and when the conversation information includes the term indicative of the conversation section, it may be determined to be a conversation section. Examples of the term indicative of the conversation section include "DESU.", "DEHANAIDESHOKA.", "DESUKA.", "NARUNODESU.", "DESHOKA.", "GOZAIMASU.", "ITADAKIMASU.", "NARIMASU.", and "E-".

In a preferred aspect of the voice analysis system 1, the related term stored by the related term storage unit 15 includes a presenter related term and a listener related term. The conversation section obtaining unit 33 is configured to use the presenter related term and the listener related term included in the conversation information to analyze the conversation section.

Since a presentation related term used by the presenter and a term stated by a listener are different, each term is analyzed to ensure separating the conversation sections.

The specific related term reading unit 35 is an element configured to extract the related terms related to the specific presentation material included in the first conversation information and the second conversation information.

For example, since "diabetes", "new medicine", "XYZ", "ABC" (name of another therapeutic agent), "blood glucose level", "side effect", "blood sugar", "glaucoma", "retinopathy", "insulin", "DC pharmaceutical", and "insert" are stored in the storage unit related to a material name (present position) and its page number of a certain presentation, the related term reading unit 35 reads these related terms related to the specific presentation material from the storage unit. Arithmetic processing for whether to match the term included in the first conversation information with the related term is performed. The matched related term is stored in the storage unit together with the conversation information and a section number.

For example, the first conversation information is formed of the two conversation sections, and the first conversation section, "Now the XYZ as a new medicine for diabetes will be described." includes the three related terms "diabetes", "new medicine", and "XYZ". Meanwhile, the related term is not present in the second conversation section of the first conversation information. For example, the first voice analysis terminal 3 stores the related terms "diabetes", "new medicine", and "XYZ" and the value of 3 regarding the first conversation section of the first conversation information. Note that only the value of 3 may be stored, or only the related terms may be stored regarding this conversation section. The same applies to the second conversation section and the next second conversation information.

The first conversation section of the second conversation information "Now the XYZ 'TONYUBYO NI KANSURU SHINYAKU' will be described." includes one related term "XYZ". Meanwhile, the second conversation section of the second conversation information "Does it lower the blood glucose level?" includes one related term "blood glucose level".

Similarly to the first voice analysis terminal, the second voice analysis terminal of the system of this aspect can obtain the correct conversation section. Accordingly, the processes of the respective elements are similar to those of the above-described aspects.

An aspect described in this Specification relates to a server client system. In this case, for example, the first mobile terminal includes the display unit 17, and a server may serve as any one or two or more elements among the first term analysis unit 7, the first conversation storage unit 9, the first analysis unit 11, the presentation storage unit 13, the related term storage unit 15, the topic word storage unit 19, and the conversation information reception unit 25.

An aspect described in this Specification relates to a program. This program is a program that causes the computer and the processor in the computer to function as the first term analysis unit 7, the first conversation storage unit 9, the first analysis unit 11, the presentation storage unit 13, the related term storage unit 15, the display unit 17, the topic word storage unit 19, and the conversation information reception unit 25. This program can be a program to implement the system of each aspect described above. This program may employ an aspect of an application installed on the mobile terminal.

An aspect described in this Specification relates to a computer-readable information recording medium storing the program described above. Examples of the information recording medium include a CD-ROM, a DVD, a floppy disk, a memory card, and a memory stick.

Figure 2:
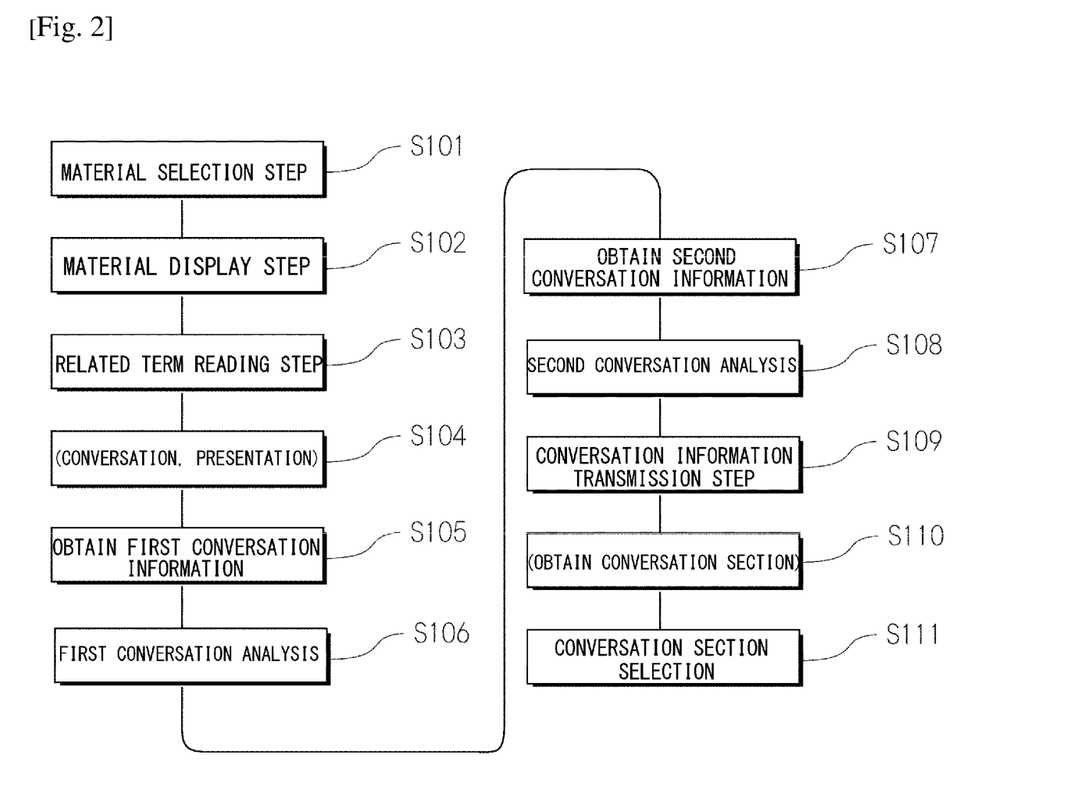
FIG. 2 is a flowchart depicting a process example of the voice analysis system.
Figure 3:
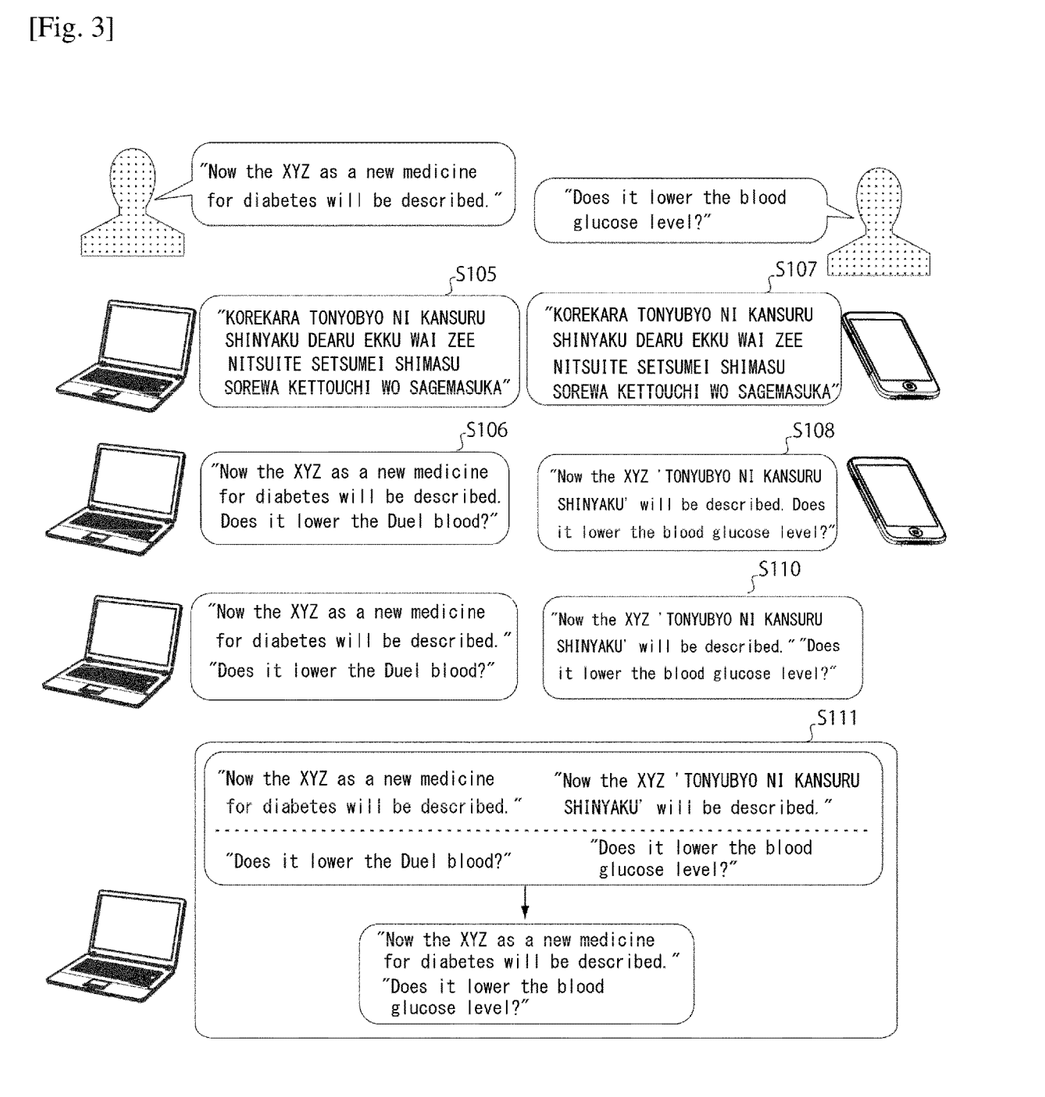
FIG. 3 is a conceptual diagram illustrating a process example of the voice analysis system.

FIG. 2 is a flowchart depicting a process example of the voice analysis system. FIG. 3 is a conceptual diagram illustrating a process example of the voice analysis system. The above-described program has been installed on the two mobile terminals. One terminal is, for example, a notebook computer for an MR and the remaining mobile terminal is a smart phone placed near the doctor as the other person so as to easily pick up the voice of the other person. The application implementing the above-described program has been installed on the notebook computer and the smart phone.

Presentation Material Selection Step (S101)

The MR opens PowerPoint (registered trademark) stored in the notebook computer or read from the server. Then, information on the selection of the PowerPoint (registered trademark) is input to the personal computer.

Presentation Material Display Step (S102)

A display unit of the notebook computer displays a page of the presentation material generated with the PowerPoint (registered trademark). Meanwhile, a display unit of the smart phone also displays the page of the PowerPoint (registered trademark).

Related Term of Presentation Material Reading Step (S103)

Meanwhile, the specific related term related to the presentation material generated with the PowerPoint (registered trademark) is read from the storage unit. Examples of the read specific related terms include "diabetes", "new medicine", "XYZ", "ABC" (name of another therapeutic agent), "blood glucose level", "side effect", "blood sugar", "glaucoma", "retinopathy", "insulin", "DC pharmaceutical", and "insert". The read specific related term is temporarily stored in the storage unit appropriately.

Conversation Based on Presentation Material (S104)

The MR and the doctor have a conversation about the displayed material. The conversation may be a presentation or may be a description. Examples of the conversation include "Now the XYZ as a new medicine for diabetes will be described." "Does it lower the blood glucose level?" (FIG. 3).

First Conversation Information Obtaining Step (S105)

The notebook computer records the conversations and inputs them in the computer. The notebook computer analyzes words included in the conversations to obtain the first conversation information. An example of the first conversation information before the analysis includes "KOREKARA TONYOBYO NI KANSURU SHINYAKU DEARU EKKU WAI ZEE NITSUITE SETSUMEI SHIMASU SOREWA KETTOUCHI WO SAGEMASUKA". The notebook computer is installed on the MR side to excellently pick up the voice of the MR. The conversation information is stored in the storage unit.

First Conversation Analysis Step (S106)

For example, the first conversation information after the analysis is a conversational sentence like "Now the XYZ as a new medicine for diabetes will be described. Does it lower the Duel blood?". The analyzed conversational sentence is stored in the storage unit. Note that, in this first conversation information, the conversation section may be analyzed. In the case, an example of the conversation section is like "Now the XYZ as a new medicine for diabetes will be described." and "Does it lower the Duel blood?". The conversation section may be analyzed in a later step.

Second Conversation Information Obtaining Step (S107)

The conversations are input to and stored in the smart phone as well. The conversations are analyzed by a started application in the smart phone as well. An example of the second conversation information includes "KOREKARA TONYUBYO NI KANSURU SHINYAKU DEARU EKKU WAI ZEE NITSUITE SETSUMEI SHIMASU SOREWA KETTOUCHI WO SAGEMASUKA". The notebook computer and the smart phone differ in the installed positions, directions of sound pickup, and the like. Accordingly, even when the same conversation is analyzed, there is a difference in the analyzed conversation between the notebook computer (first voice analysis terminal) and the smart phone (second voice analysis terminal). This step is usually performed simultaneously with the first conversation information obtaining step (S105).

Second Conversation Analysis Step (S108)

The second conversation information is analyzed also on the smart phone side. An example of the second conversation information is like "Now the XYZ 'TONYUBYO NI KANSURU SHINYAKU' will be described. Does it lower the blood glucose level?". The conversation section may be analyzed at this time. The second conversation in which the conversation section has been analyzed is like "Now the XYZ 'TONYUBYO NI KANSURU SHINYAKU' will be described." and "Does it lower the blood glucose level?". The second conversation information is also appropriately stored in the storage unit. The second conversation information may be analyzed by the notebook computer (the first voice analysis terminal) or the server.

Second Conversation Information Transmission Step (S109)

The second conversation information is transmitted, for example, from the smart phone to the notebook computer. Then, the notebook computer (first voice analysis terminal 3) receives the second conversation information transmitted from the smart phone (second voice analysis terminal 5).

Conversation Section Obtaining Step (S110)

The conversation sections in the first conversation information and the second conversation information may be analyzed to obtain one or a plurality of the conversation sections. The conversation section may be analyzed in each terminal. Meanwhile, collectively analyzing the conversation sections of the conversation information recorded in the two terminals by the notebook computer (first voice analysis terminal) allows obtaining the corresponding conversation sections between the first conversation information and the second conversation information, and therefore is preferred. In this case, the respective conversation sections of the first conversation information should be almost the same as the respective conversation sections of the second conversation information in conversation time. Therefore, matching the respective sections using timing means is preferred. Thus, the first conversation information is divided into sections and also the respective corresponding conversation sections of the second conversation information can be obtained.

The conversation section obtaining unit 33 may also analyze the conversation section in the second conversation information to obtain one or a plurality of the conversation sections.

The first conversation information is analyzed to conversational sentences like "Now the XYZ as a new medicine for diabetes will be described." "Does it lower the Duel blood?".

The second conversation information is analyzed to conversational sentences like "Now the XYZ 'TONYUBYO NI KANSURU SHINYAKU' will be described." "Does it lower the blood glucose level?".

Conversation Section Selection Step (S111)

The first terms in conversation, "diabetes", "new medicine", and "XYZ", which are the terms in conversation included in "Now the XYZ as a new medicine for diabetes will be described.", which is the first conversation section, are extracted.

Then, using the first terms in conversation, "diabetes", "new medicine", and "XYZ", the topic words stored associated with the terms are read from the topic word storage unit 19. Here, "XYZ", which is the topic word common to the three terms in conversation, is extracted as the first topic word.

The second terms in conversation, "TONYU", "BYO", "NI KAN", "SHINYAKU", and "XYZ", which are the terms in conversation included in "Now the XYZ 'TONYUBYO NI KANSURU SHINYAKU' will be described.", which is the second conversation section, are extracted. Using the second terms in conversation, "TONYU", "BYO", "NI KAN", "SHINYAKU", and "XYZ", the topic words stored associated with them are read from the topic word storage unit 19. Here, the topic word common to the largest number of terms among the five terms in conversation, "the Bible", is extracted as the second topic word.

Comparison between "XYZ" as the first topic word and the specific related terms, "diabetes", "new medicine", "XYZ", "ABC" (name of another therapeutic agent), "blood glucose level", "side effect", "blood sugar", "glaucoma", "retinopathy", "insulin", "DC pharmaceutical", and "insert" finds that the first topic word is the specific related term. Meanwhile, comparison between "the Bible" as the second topic word and the specific related terms finds that the second topic word is not the specific related term. Using the result, the first conversation section "Now the XYZ as a new medicine for diabetes will be described." is employed as the correct conversation section. The subsequent second conversation section will be similarly determined which is correct. The continuation of the conversation sections thus employed are stored in the storage unit.

The continuation of the conversation sections is "Now the XYZ as a new medicine for diabetes will be described." "Does it lower the blood glucose level?"

The above-described process is an example, and the correct conversation section may be employed by performing a process different from it.

Figure 4:
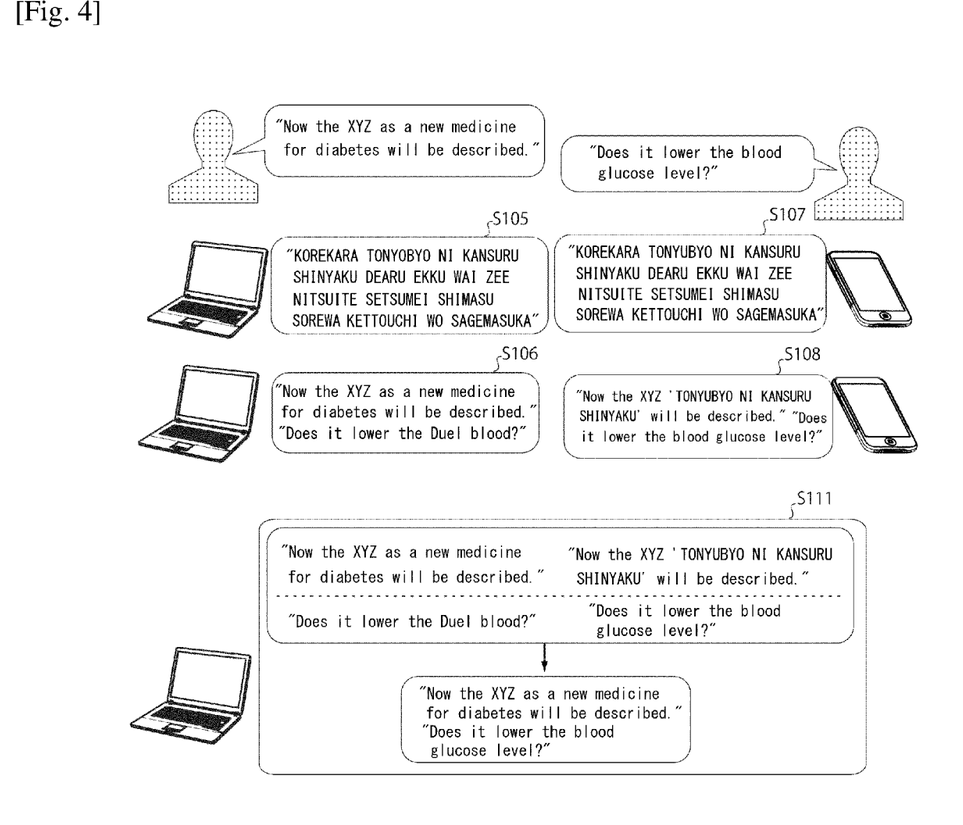
FIG. 4 is a conceptual diagram illustrating a second process example of the voice analysis system.

FIG. 4 is a conceptual diagram illustrating a second process example of the voice analysis system. In this example, the second voice analysis terminal analyzes the conversation sections, and the second conversation information in which the conversation section has been analyzed is transmitted to the first voice analysis terminal. In this example as well, to avoid inconsistency of the conversation sections, it is preferred that the respective conversation sections are associated with the clock time information and stored and are transmitted from the second voice analysis terminal to the first voice analysis terminal together with the clock time information. Then, the first voice analysis terminal can match the conversation sections included in the first conversation information with the conversation sections included in the second conversation information.

Figure 5:
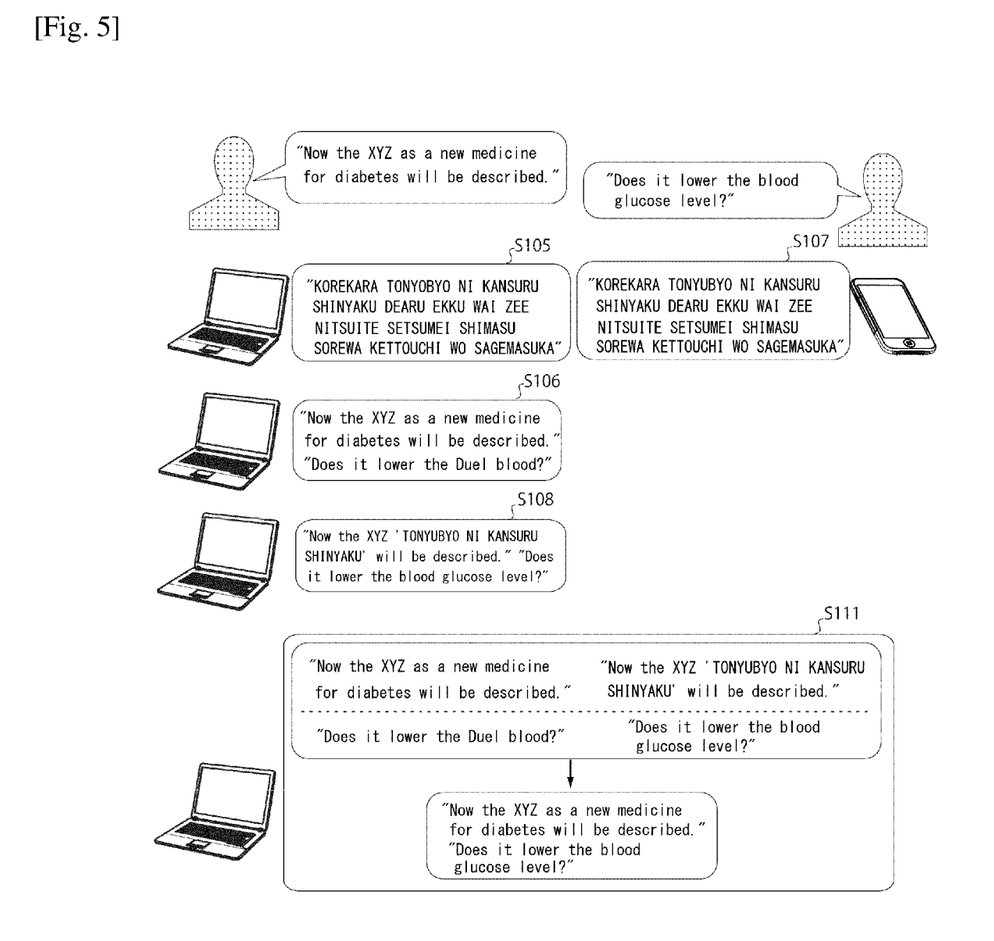
FIG. 5 is a conceptual diagram illustrating a third process example of the voice analysis system.

FIG. 5 is a conceptual diagram illustrating a process example of the voice analysis system different from the above-described process example. In this example, the second voice analysis terminal picks up the sound, digitalized conversation information is transmitted to the first voice analysis terminal, and the first voice analysis terminal performs various kinds of analysis. Note that although not particularly illustrated, not only the first voice analysis terminal but also the second voice analysis terminal may analyze the correct conversation section.

INDUSTRIAL APPLICABILITY

This system can be used as a voice analysis device. Especially, a voice analysis device, such as a Google speaker (registered trademark), probably becomes further popular in the future. Additionally, the voice analysis device is assumed to be mounted on a terminal familiar with a user, such as a smart phone and a mobile terminal. For example, a case where noise different from a voice of the user is recorded in the voice analysis device and the voice of the user is less likely to be recorded is assumed. Meanwhile, even in such a case, a terminal present close to the user probably can appropriately record the voice of the user. Then, the terminal close to the user records sound information and shares the sound information with the voice analysis device, thus ensuring analyzing the voice with further high accuracy.

DESCRIPTION OF REFERENCE SIGNS

1 Voice analysis system
3 First voice analysis terminal

5 Second voice analysis terminal
7 First term analysis unit
9 First conversation storage unit
11 First analysis unit
13 Presentation storage unit
15 Related term storage unit
17 Display unit
19 Topic word storage unit
21 Second term analysis unit
23 Second conversation storage unit
25 Conversation information reception unit
31 Specific presentation information obtaining unit
33 First conversation section obtaining unit
35 Specific related term reading unit
37 First term-in-conversation extraction unit
39 First topic word extraction unit
41 Second term-in-conversation extraction unit
43 Second topic word extraction unit
45 Conversation section employment unit

The invention claimed is:

1. A voice analysis system comprising:
a first voice analysis device (3); and
a second voice analysis device (5), wherein
the first voice analysis device (3) is a device that includes:
  a first term analysis means (7) configured to analyze a word included in a conversation to obtain first conversation information;
  a first conversation storage means (9) configured to store the first conversation information analyzed by the first term analysis means (7);
  a first analysis means (11) configured to analyze the first conversation information stored by the first conversation storage means (9);
  a presentation storage means (13) configured to store a plurality of presentation materials;
  a related term storage means (15) configured to store related terms related to the respective presentation materials stored in the presentation storage means (13);
  a display means (17) configured to display any of the presentation materials stored by the presentation storage means (13); and
  a topic word storage means (19) configured to store a topic word related to a term in conversation,
the second voice analysis device (5) is a device that includes:
  a second term analysis means (21) configured to analyze the word included in the conversation to obtain second conversation information; and
  a second conversation storage means (23) configured to store the second conversation information analyzed by the second term analysis means (21),
the first voice analysis device (3) further includes a conversation information reception means (25) configured to receive the second conversation information from the second voice analysis device (5),
the first conversation storage means (9) is configured to also store the second conversation information received by the conversation information reception means (25), and
the first analysis means (11) includes:
  a specific presentation information obtaining means (31) configured to receive information on a selection of a specific presentation material as a certain presentation material among the plurality of presentation materials;
  a first conversation section obtaining means (33) configured to analyze a conversation section in the first conversation information to obtain one or a plurality of conversation sections;
  a specific related term reading means (35) configured to read a specific related term as a related term related to the specific presentation material from the related term storage means (15);
  a first term-in-conversation extraction means (37) configured to extract a first term in conversation as the term in conversation that is included in a first conversation section as a certain conversation section in the first conversation information and is analyzed by the first analysis means (11);
  a first topic word extraction means (39) configured to extract a first topic word as a topic word related to the first term in conversation from the topic word storage means (19);
  a second term-in-conversation extraction means (41) configured to extract a second term in conversation as the term in conversation included in a second conversation section as the conversation section corresponding to the first conversation section in the second conversation information;
  a second topic word extraction means (43) configured to extract a second topic word as the topic word related to the second term in conversation from the topic word storage means (19); and
  a conversation section employment means (45) configured to employ the first conversation section or the second conversation section as a correct conversation section using a relationship between the first topic word and the specific related term and a relationship between the second topic word and the specific related term.

2. The voice analysis system according to claim 1, wherein
the conversation section employment means (45) is configured such that:
  when the first topic word differs from the second topic word,
    and when the first topic word is the specific related term and the second topic word is not the specific related term, the conversation section employment means (45) employs the first conversation section in the first conversation information as the correct conversation section; and
    when the first topic word is not the specific related term and the second topic word is the specific related term, the conversation section employment means (45) employs the second conversation section in the second conversation information as the correct conversation section.

3. The voice analysis system according to claim 1, wherein
the conversation section employment means (45) is configured to compare a count of the first topic words being the specific related terms with a count of the second topic words being the specific related terms, the conversation section employment means (45) is configured such that when the former is larger, the conversation section employment means (45) employs the first conversation section as the correct conversation section, and the conversation section employment means (45) is configured such that when the latter is larger, the conversation section employment means (45) employs the second conversation section as the correct conversation section.

4. The voice analysis system according to claim 1, wherein
- the first voice analysis device (3) further includes a recorded time storage means (51) configured to store a recorded time and a period,
- the first conversation information includes a recorded time related to each word together with the words included in the conversation, and
- the first conversation section obtaining means (33) is configured to analyze the conversation section using clock time information for each word.

5. The voice analysis system according to claim 1, wherein
- the first voice analysis device (3) further includes a frequency analysis means (53) configured to analyze a frequency of a voice included in the conversation,
- the first conversation information includes the frequency of the voice related to each word together with the words included in the conversation, and
- the first conversation section obtaining means (33) is configured to analyze the conversation section using the frequency of each word.

6. The voice analysis system according to claim 1, wherein
- the related term stored by the related term storage means (15) includes a presenter related term and a listener related term, and
- the first conversation section obtaining means (33) is configured to use the presenter related term and the listener related term included in the first conversation information to analyze the conversation section.

7. The voice analysis system according to claim 1, wherein
- the first voice analysis device (3) further includes an incorrect conversion term storage means (55) configured to store an incorrect conversion term related to each of the plurality of presentation materials, and
- the first analysis means (11) is configured such that when the incorrect conversion term related to the specific presentation material is included, the first analysis means (11) corrects a term included in the correct conversation section using a term corresponding to the incorrect conversion term included in the correct conversation section among terms included in a conversation section not employed as the correct conversation section among the respective conversation sections.

\* \* \* \* \*